(12) United States Patent
Nagasaki (10) Patent No.: US 8,797,581 B2
(45) Date of Patent: Aug. 5, 2014

(54) WIRELESS COMMUNICATION DEVICE FOR ESTABLISHING WIRELESS CONNECTION WITH EXTERNAL DEVICE

(75) Inventor: Takeshi Nagasaki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 113 days.

(21) Appl. No.: 13/429,664

(22) Filed: Mar. 26, 2012

(65) Prior Publication Data

US 2012/0320413 A1    Dec. 20, 2012

(30) Foreign Application Priority Data

Jun. 14, 2011    (JP) .................................. 2011-132286

(51) Int. Cl.
*G06F 3/12*    (2006.01)

(52) U.S. Cl.
USPC ........ 358/1.15; 358/1.13; 358/1.16; 370/338; 370/913; 455/515; 455/517; 455/525; 455/41.2; 455/41.3

(58) Field of Classification Search
None
See application file for complete search history.

(56) References Cited

U.S. PATENT DOCUMENTS

| | | | |
|---|---|---|---|
| 2006/0075124 A1* | 4/2006 | Dougherty et al. | 709/228 |
| 2008/0031210 A1* | 2/2008 | Abhishek et al. | 370/338 |
| 2009/0156123 A1* | 6/2009 | Kim | 455/41.2 |
| 2011/0188064 A1* | 8/2011 | Awata | 358/1.13 |
| 2011/0250927 A1* | 10/2011 | Nakada | 455/525 |
| 2011/0298736 A1* | 12/2011 | Madonna et al. | 345/173 |

FOREIGN PATENT DOCUMENTS

| | | |
|---|---|---|
| JP | 2008-035418 A | 2/2008 |
| WO | 2006/071650 A2 | 7/2006 |
| WO | 2008/019138 A2 | 2/2008 |
| WO | 2008/019140 A2 | 2/2008 |

OTHER PUBLICATIONS

Wi-Fi Alliance Technical Committee P2P Task Group: Wi Fi Peer-to-Peer (P2P) Technical Specification, Version 1.1 2010.
"Wi-Fi Certified for Wi-Fi Protected Setup: Easing the User Experience for Home and Small Office Wi-Fi Networks," Wi-Fi Alliance, Internet Citation, 2007, pp. 1-14, Retrieved from the Internet: URL:http://www.wi-fi.org/wp/wifi-protected-setup [retrieved on Feb. 1, 2010].
European Patent Office, extended European Search Report for European Patent Application No. 12160616.4 (counterpart European patent application), dated Nov. 14, 2012.

* cited by examiner

*Primary Examiner* — Miya J Cato
(74) *Attorney, Agent, or Firm* — Merchant & Gould PC (57) ABSTRACT

A wireless communication device may execute a response process and a search process with a first operation being performed as a trigger in a first period after the first operation. The response process may include receiving a search signal from a specific external device and sending a response signal to the specific external device in response to the search signal. The search process may include sending the search signal to the specific external device and receiving the response signal from the specific external device. The wireless communication device may communicate a wireless profile with the specific external device so as to establish a wireless connection with the specific external device in a case where the first operation is performed. The wireless communication device may execute the response process in a second period before the first operation is performed.

13 Claims, 6 Drawing Sheets

WIRELESS COMMUNICATION DEVICE FOR ESTABLISHING WIRELESS CONNECTION WITH EXTERNAL DEVICE

CROSS-REFERENCE TO RELATED APPLICATIONS

This application claims priority to Japanese Patent Application No. 2011-132286, filed on Jun. 14, 2011, the contents of which are hereby incorporated by reference into the present application.

TECHNICAL FIELD

A technique disclosed in the present specification relates to a wireless communication device.

DESCRIPTION OF THE RELATED ART

Conventionally, Wi-Fi Direct (called "WFD" below), formulated by Wi-Fi Alliance, is known. In WFD, when a predetermined operation is performed on a wireless communication device that is to establish a wireless connection with an external device, the wireless communication device executes a response process, in which the wireless communication device receives a Probe Request signal from the external device and sends a Probe Response signal, and executes a search process, in which the wireless communication device sends a Probe Request signal to the external device and receives a Probe Response signal. For example, if the external device can find the wireless communication device, the external device sends a connection request signal to the wireless communication device. Consequently, a wireless connection can be established between the external device and the wireless communication device.

SUMMARY

In the present specification, a technique is disclosed for causing a wireless connection to be established appropriately between a wireless communication device and an external device.

One technique disclosed in the present application is a wireless communication device. The wireless communication device may comprise one or more processors, and a memory that stores a computer program including instructions executed by the one or more processors. The instructions may cause the one or more processors, when executed by the one or more processors, to function as a communication controlling unit and an establishing controlling unit. The communication controlling unit may be configured to execute a response process and a search process with a first operation being performed as a trigger in a first period after the first operation. The response process may include receiving a search signal from a specific external device and sending a response signal to the specific external device in response to the search signal. The search signal received from the specific external device may be a signal for the specific external device to search for the wireless communication device. The search process may include sending the search signal to the specific external device and receiving the response signal from the specific external device. The search signal sent to the specific external device may be a signal for the wireless communication device to search for the specific external device. The establishing controlling unit may be configured to communicate a wireless profile with the specific external device so as to establish a wireless connection with the specific external device by using the wireless profile in a case where the first operation is performed. The communication controlling unit may be further configured to execute the response process in a second period before the first operation is performed.

Moreover, a method for realizing the wireless communication device is also novel and useful. In addition, a computer program for realizing the wireless communication device and a non-transitory computer readable storage medium that stores the computer program are also novel and useful.

EMBODIMENT

Embodiment

Configuration of System

Figure 1:
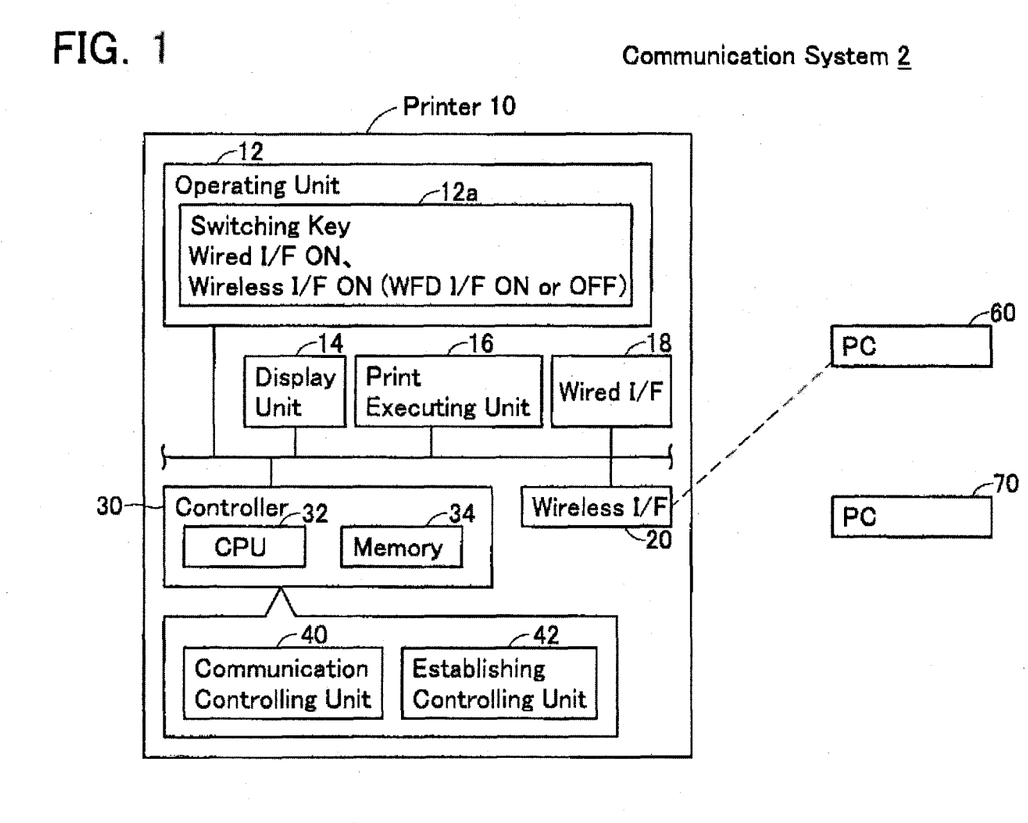
FIG. 1 shows an example of the configuration of a communication system.

As shown in FIG. 1, a communication system 2 comprises a printer 10 (a peripheral of PCs 60 and 70), and the plurality of PCs 60, 70. The apparatuses 10, 60, 70 are each capable of executing a wireless communication function in accordance with Wi-Fi Direct (to be described). Moreover, below, Wi-Fi Direct is called "WFD", and the wireless communication function in accordance with Wi-Fi Direct is called a "WFD function". The apparatuses 10, 60, 70 are capable of establishing a wireless connection in accordance with WFD, thereby constructing a wireless network. Consequently, the apparatuses 10, 60, 70 become capable of wirelessly communicating object data of a communication object, such as printing data, etc.

(Configuration of Printer 10)

The printer 10 comprises an operating unit 12, a display unit 14, a print executing unit 16, a wired interface 18, a wireless interface 20, and a controller 30. The units 12 to 30 are connected with a bus line (reference number omitted).

The operating unit 12 consists of a plurality of keys. A user can provide various instructions to the printer 10 by operating the operating unit 12. The plurality of keys constituting the operating unit 12 includes a switching key 12*a*. The display unit 14 is a display for displaying various information. The print executing unit 16 comprises a printing mechanism such as an ink jet method, laser method, etc. printing mechanism, and executes printing according to an instruction from the controller 30. The wired interface 18 is an interface for executing wired communication, and is connected with a wired circuit (e.g., a LAN circuit). The wireless interface 20 is an interface for executing wireless communication. Moreover, two MAC addresses are assigned to the wireless interface 20. One of the MAC addresses is an address for wireless communication in accordance with WFD, and the other of the MAC addresses is an address for normal wireless communication in accordance with a standard differing from WFD.

The controller 30 comprises a CPU 32 and a memory 34. The CPU 32 executes various processes according to a program stored in the memory 34. The memory 34 consists of a ROM, RAM, hard disk, etc. The memory 34 stores the program executed by the CPU 32, and stores data acquired or created in the course of the CPU 32 executing processes. The CPU 32 realizes the functions of a communication controlling unit 40 and an establishment controlling unit 42 by executing processes according to the aforementioned program.

(Switching Key 12*a*)

In the present embodiment, the switching key 12*a* is a soft switch. However, in a variant, the switching key 12*a* may be a hard switch. The switching key 12*a* is a switch for switching settings between a setting for turning ON the wired interface 18 (called "wired I/F ON setting" below) and a setting for turning ON the wireless interface 20 (called "wireless I/F ON setting" below). The switching key 12*a* is a toggle type switch. Consequently, by operating the switching key 12*a*, the user can exclusively select the wired I/F ON setting or the wireless I/F ON setting.

In a state where the wired. I/F ON setting has been selected, the communication controlling unit 40 (see FIG. 1) can execute wired communication using the wired interface 18, but cannot execute wireless communication using the wireless interface 20. Further, in a state where the wireless I/F ON setting has been selected, the communication controlling unit 40 cannot execute wired communication using the wired interface 18, but can execute wireless communication using the wireless interface 20.

As described above, a MAC address for wireless communication in accordance with WFD and a MAC address for normal wireless communication are assigned to the wireless interface 20. In the state where the wireless I/F ON setting has been selected, the user can operate the switching key 12*a* to further exclusively select a setting for executing wireless communication in accordance with WFD (called "WFD I/F ON setting" below) or a setting for executing normal wireless communication (called "normal wireless I/F ON setting" below).

In the state where the WFD I/F ON setting has been selected, the communication controlling unit 40 can execute wireless communication in accordance with WFD by using the MAC address for wireless communication in accordance with WFD, but cannot execute normal wireless communication by using the MAC address for normal wireless communication. In the state where the normal wireless I/F ON setting has been selected, the communication controlling unit 40 can execute normal wireless communication, but cannot execute wireless communication in accordance with WFD. Moreover, below, the wired I/F ON setting, and the normal wireless I/F ON setting are together called "WFD I/F OFF setting".

(Configuration of PC 60)

A PC 60 comprises a CPU, memory, display, etc. (not shown). The memory of the PC 60 stores a printer driver program for the printer 10. The CPU of the PC 60 can create printing data of a printing object by using the printer driver program. In a state where a wireless connection has been established between the printer 10 and the PC 60, the PC 60 can wirelessly send the printing data to the printer 10. Moreover, the PC 70 has the same configuration as the PC 60.

(WFD)

As described above, the apparatuses 10, 60, 70 are capable of executing the WFD function. WFD is a standard formulated by Wi-Fi Alliance. WFD is described in "Wi-Fi Peer-to-Peer (P2P) Technical Specification Version 1.1" created by Wi-Fi Alliance.

In WFD, three states have been defined as the states of the apparatus: Group Owner state (called "G/O state" below), client state, and device state. An apparatus capable of executing the WFD function is capable of selectively operating in one state among the three states.

One wireless network consists of an apparatus in the G/O state and an apparatus in the client state. There can be only one G/O state apparatus present in one wireless network, but one or more client state apparatuses can be present. The G/O state apparatus manages the one or more client state apparatuses. Specifically, the G/O state apparatus creates an administration list in which identification information (i.e., MAC address) of each of the one or more client state apparatuses is written. When a client state apparatus newly participates in a wireless network, the G/O state apparatus adds the identification information of that apparatus to the administration list, and when the client state apparatus leaves the wireless network, the G/O state apparatus deletes the identification information of that apparatus from the administration list.

The G/O state apparatus is capable of wirelessly communicating object data of a communication object (e.g., data that includes network layer information of the OSI reference model (printing data, etc.)) with an apparatus registered in the administration list, i.e., with an apparatus in the client state. However, with an apparatus not registered in the administration list, the G/O state apparatus is capable of wirelessly communicating data for participating in the wireless network (e.g., data that does not include network layer information (physical layer data such as a Probe Request signal, Probe Response signal, etc.)) but is not capable of wirelessly communicating the object data. For example, the printer 10 that is in the G/O state is capable of wirelessly receiving printing data from the PC 60 that is registered in the administration list (i.e., the PC 60 that is in the client state), but is not capable of wirelessly receiving printing data from a PC that is not registered in the administration list.

Further, the G/O state apparatus is capable of relaying the wireless communication of object data (printing data, etc.) between a plurality of client state apparatuses. For example, in case the PC 60 that is in the client state should wirelessly send object data to the PC 70 that is in the client state, the PC 60 lust wirelessly sends the object data to the printer 10 that is in the G/O state, and the printer 10 wirelessly sends the object data to the PC 70. That is, the G/O state apparatus is capable of executing the function of an AP (access point) of a wireless network.

Moreover, an apparatus that is not participating in the wireless network (i.e., an apparatus not registered in the administration list) is a device state apparatus. The device state apparatus is capable of wirelessly communicating data for participating in the wireless network (physical layer data such as a Probe Request signal, Probe Response signal, etc.), but is not capable of wirelessly communicating object data (printing data, etc.) via the wireless network.

(Mode for Executing WFD Wireless Connection)

A WPS (Wi-Fi Protected Setup) wireless connection mode is used as the mode for executing a WFD wireless connection. The WPS wireless connection mode includes a PIN (Personal Identification Number) code mode and a PBC (Push Button Configuration) mode. Below, a summary of the PIN code mode will be described first, then a summary of the PBC mode will be described.

(PIN Code Mode)

For example, a situation is assumed in which a wireless connection between the printer 10 that is in the device state and the PC 60 that is in the device state is to be established using the WPS PIN code mode. In such a situation, the user performs a mode selection operation in the operating unit 12 of the printer 10 to select the PIN code mode from among the PBC mode and the PIN code mode. Further, the user performs a mode selection operation in an operating unit of the PC 60 to select the PIN code mode.

In this case, the printer 10 and the PC 60 each execute a search process (explained in detail below) to find the other. For example, in case the PC 60 has found the printer 10, the user executes an apparatus selection operation in the operating unit of the PC 60 to select the printer 10. Consequently, the PC 60 sends a connection request signal to the printer 10. In this case, e.g., the printer 10 creates and displays a PIN code. The user inputs the PIN code into the PC 60.

The printer 10 and the PC 60 execute G/O negotiation (explained in detail below) to determine which will assume the G/O state and which will assume the client state. Next, the printer 10 and the PC 60 execute WPS negotiation. Specifically, the apparatus which assumes the G/O state (e.g., the printer 10) wirelessly sends a wireless profile (SSID, authentication mode, encryption mode, password, etc.), this being information needed to establish a wireless connection, to the apparatus which assumes the client state (e.g., the PC 60). Consequently, the printer 10 and the PC 60 can establish a wireless connection by using the same wireless profile. Moreover, authentication of the PIN code is performed during the course of the WPS negotiation.

(PBC Mode)

The user can perform the mode selection operation to select the PBC mode in each of the printer 10 and the PC 60. In this ease, the PIN code is not input by the user into the printer 10 and the PC 60. In the PBC mode, a predetermined PIN code is used in the apparatuses between which a wireless connection is to be established. Other points (search process, G/O negotiation, and WPS negotiation) are the same as the PIN code mode.

Figure 2:
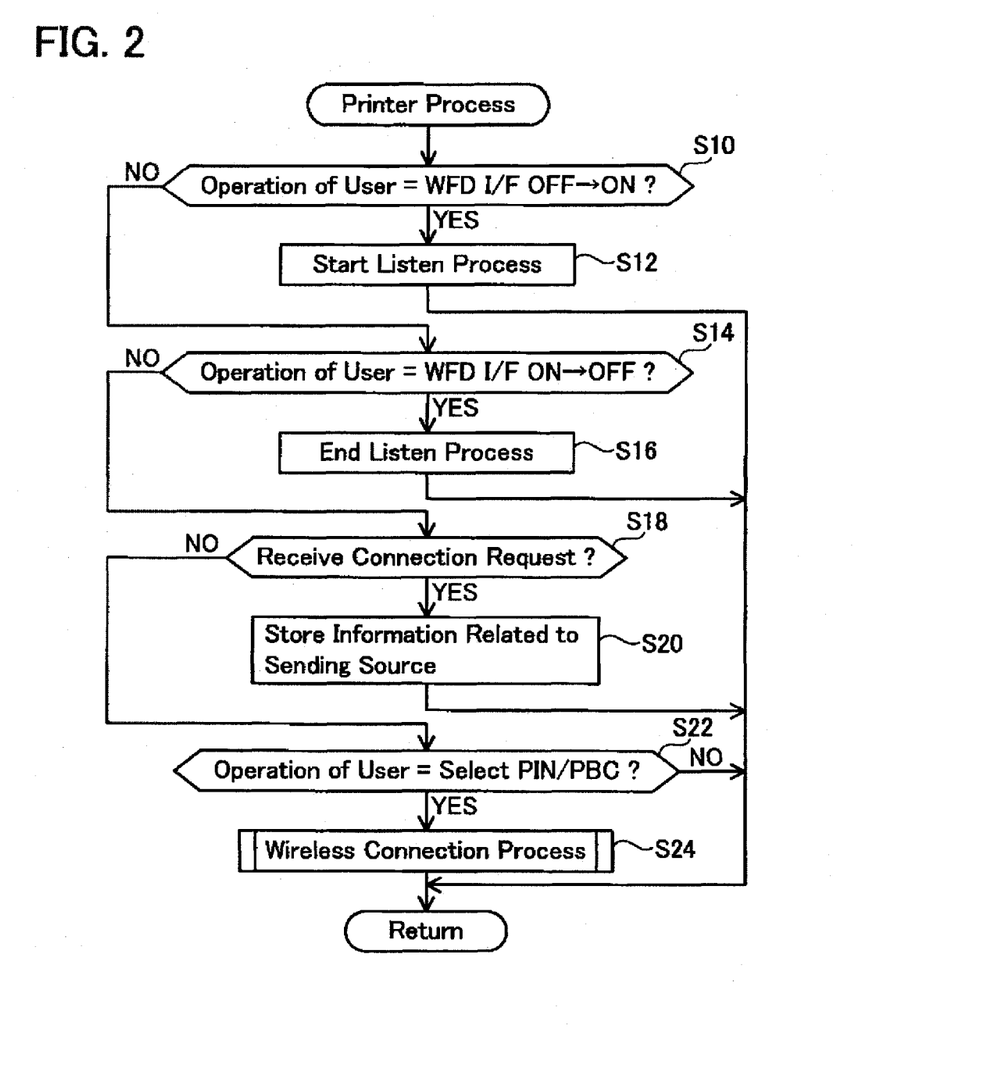
FIG. 2 shows a flowchart of a printer process.

(Printer Process: FIG. 2)

Next, the contents of a printer process executed by the printer 10 of the present embodiment will be described with reference to FIG. 2.

The user can perform an operation on the switching key 12*a* (see FIG. 1) to change from the WFD I/F OFF setting (e.g., the wired I/F ON setting) to the WFD I/F ON setting. In this case, the controller 30 determines YES in S10, and proceeds to S12. In S12, the communication controlling unit 40 starts a Listen process (to be described).

Further, the user can perform an operation on the switching key 12*a* to change from the WFD I/F ON setting to the WED I/F OFF setting (e.g., the wired I/F ON setting). In this case, the controller 30 determines NO in S10, determines YES in S14, and proceeds to S16. In S16, the communication controlling unit 40 ends the Listen process.

In S18, the communication controlling unit 40 monitors whether a connection request signal has been wirelessly received. Moreover, the connection request signal includes data of the physical layer of the OSI reference model, and does not include data of a layer higher than the physical layer (e.g., network layer). If the connection request signal has been wirelessly received, the communication controlling unit 40 determines NO in S10, NO in S14, YES in S18, and proceeds to S20. In S20, the communication controlling unit 40 stores information, in a predetermined storage area in the memory 34, related to a specific apparatus, this being the apparatus that is The sending source of the connection request signal. Specifically, the connection request signal includes a MAC address of the specific apparatus, an IP address of the specific apparatus, information indicating which, from among the PIN code mode and the PBC mode, has been selected in the specific apparatus, etc. The communication controlling unit 40 stores this information in the predetermined storage area.

Moreover, the communication controlling unit 40 could receive a plurality of connection request signals from a plurality of apparatuses. Each time a connection request signal is received, the communication controlling unit 40 deletes the information that was being stored in the predetermined storage area, and stores information in the predetermined storage area related to the apparatus which is the sending source of the connection request signal. Consequently, the information which was last received related to the apparatus which is the sending source of the connection request signal is stored in the predetermined storage area. Moreover, the contents stored in the predetermined storage area are deleted in case of changing from the WFD I/F ON setting to the WFD I/F OFF setting, or in case a predetermined period has elapsed since the information was last stored in the predetermined storage area.

Further, the user can perform the mode selection operation on a predetermined key included in the operating unit 12 to select the PIN code mode or the PBC mode. In this case, the controller 30 determines NO in S10, NO in S14, NO in S18, YES in S22, and proceeds to the wireless connection process of S24. Moreover, when the mode selection operation is performed in the printer 10 while the printer 10 is in the G/O state or the device state, the printer 10 executes the wireless connection process of S24 while maintaining the current state (i.e., the G/O state or the device state). When the mode selection operation is performed while the printer 10 is in the client state, the printer 10 transfers from the client state to the device state (i.e., the printer 10 leaves the wireless network in which it was participating in the client state), and executes the wireless connection process of S24 in the device state.

Figure 3:
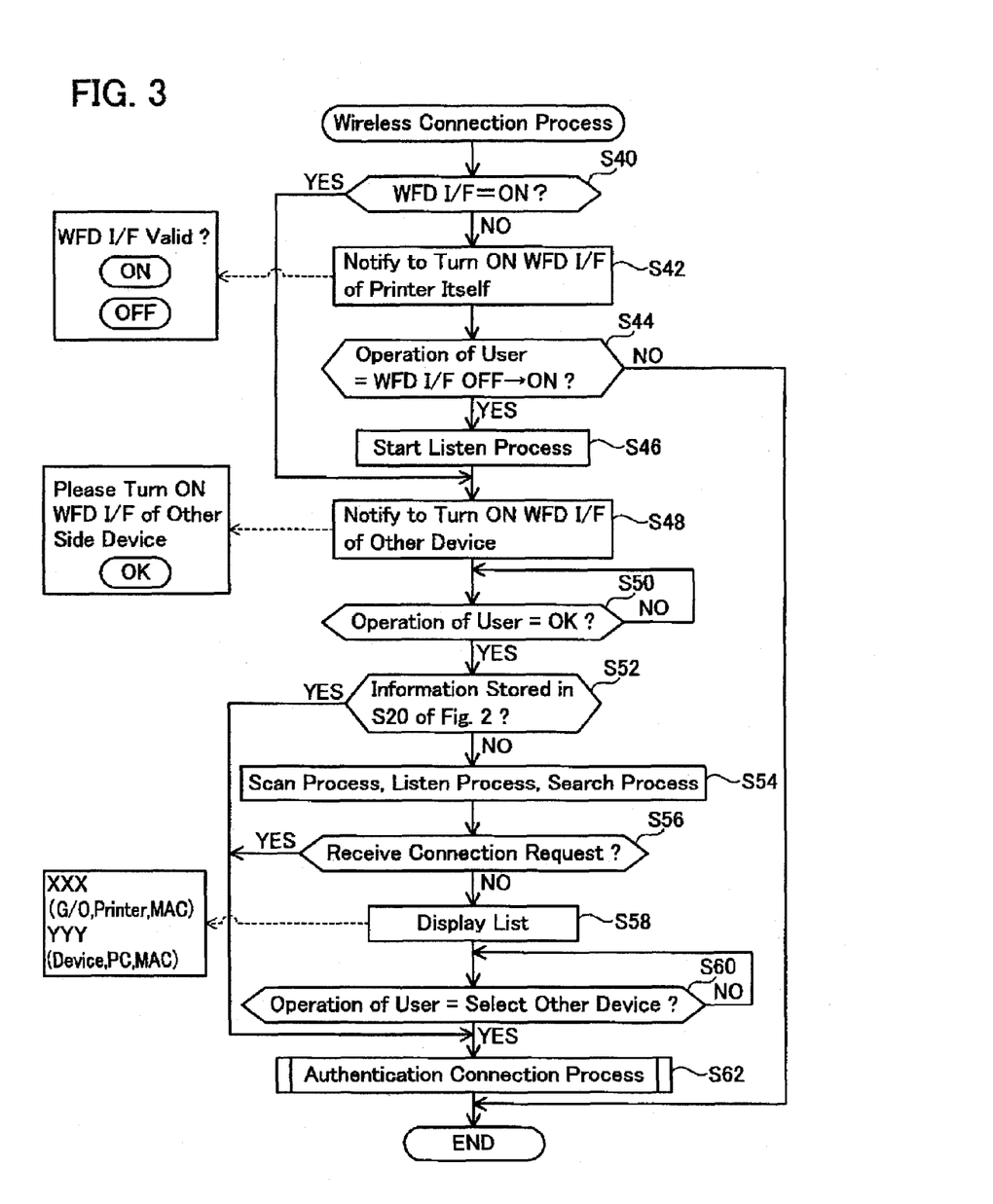
FIG. 3 shows a flowchart of a wireless connection process.

(Wireless Connection Process; FIG. 3)

In S24, the controller 30 executes the wireless connection process. As shown in FIG. 3, in S40 the controller 30 determines whether the current setting of the printer 10 is the WFD I/F ON setting. In case the current setting of the printer 10 is the WFD I/F ON setting (the case of YES in S40), the controller 30 skips S42 to S46, and proceeds to S48. On the other hand, in case the current setting of the printer 10 is the WFD I/F OFF setting (the case of NO in S40), in S42 the controller 30 causes the display unit 14 to display a screen which prompts change to the WFD IN ON setting. Thereby, the user can operate the operating unit 12 to select whether to change to the WFD I/F ON setting or to maintain the WFD I/F OFF setting.

In case change to the WFD I/F ON setting was selected by the user, the controller 30 determines YES in S44, and proceeds to S46. In S46, the communication controlling unit 40 starts the Listen process (to be described). Upon ending S46, the controller 30 proceeds to S48. On the other hand, in case maintaining the WFD OF OFF setting was selected by the user, the controller 30 determines NO in S44, skips the processes from S46 onwards, and ends the wireless connection process.

In S48, the controller 30 causes the display unit 14 to display a screen prompting the object apparatus (e.g., the PC 60), with which the printer 10 is to establish a wireless connection, to be changed to the WFD I/F ON setting. Thereby, the user can operate an operating unit of the object apparatus to change the setting of the object apparatus to the WFD I/F ON setting, and can then operate the operating unit 12 of the printer 10 to select an OK button. Moreover, in case the setting of the object apparatus is already the WFD I/F ON setting when the screen is displayed in S48, the user can operate the operating unit 12 of the printer 10 to select the OK button without having operated the operating unit of the object apparatus. When the OK button is operated, the controller 30 determines YES in S50, and proceeds to S52.

In S52, the controller 30 determines whether information is being stored in the predetermined storage area (see S20 of FIG. 2) within the memory 34. In case information is being stored in the predetermined storage area (the case of YES in S52), this means that the printer 10 has already received the connection request signal from the object apparatus (e.g., the PC 60). In this case, the communication controlling unit 40 skips S54 to S60, and proceeds to S62. On the other hand, in case information is not being stored in the predetermined storage area (the case of NO in S52), the process proceeds to S54.

In S54, the communication controlling unit 40 executes a Scan process, the Listen process, and a Search process. The communication controlling unit 40 cannot execute two or more of these three processes simultaneously and, therefore, after executing one process, it executes another process. That is, the communication controlling unit 40 executes the Scan process, the Listen process and the Search process sequentially.

The Scan process is a process for searching for a G/O state apparatus present in the surroundings of the printer 10. Specifically, in the Scan process, the communication controlling unit 40 sequentially uses thirteen channels 1 ch to 13 ch to sequentially send a Probe Request signal wirelessly.

For example, in case an apparatus that is in the G/O state (called "specific G/O apparatus" below) is present in the surroundings of the printer 10, it has been determined in advance that the specific G/O apparatus uses one channel from among 1 ch to 13 ch. Consequently, the specific G/O apparatus wirelessly receives a Probe Request signal from the printer 10. In this case, the specific G/O apparatus wirelessly sends a Probe Response signal to the printer 10. This Probe Response signal includes information indicating that the specific G/O apparatus is in the G/O state. Consequently, the communication controlling unit 40 of the printer 10 can find the specific G/O apparatus. Moreover, the Probe Response signal further includes information indicating a device name of the specific G/O apparatus and a category (e.g., printer, PC, etc.) of the specific G/O apparatus, and a MAC address of the specific G/O apparatus. Consequently, the communication controlling unit 40 can acquire information relating to the specific G/O apparatus.

Moreover, e.g., in case an apparatus that is in the device state (called "specific device apparatus" below) is present in the surroundings of the printer 10, it has been determined in advance that the specific device apparatus uses one channel from among 1 ch, 6 ch, 11 ch. Consequently, the specific device apparatus also wirelessly receives a Probe Request signal from the printer 10. In this case, the specific device apparatus wirelessly sends a Probe Response signal to the printer 10. However, this Probe Response signal includes information indicating that the apparatus is in the device state, and does not include information indicating that the apparatus is in the G/O state. Further, even if an apparatus that is in the client state wirelessly receives a Probe Request signal from the printer 10, the apparatus that is in the client state does not wirelessly send a Probe Response signal to the printer 10. Consequently, in the Scan process, the communication controlling unit 40 can appropriately find the specific G/O apparatus.

The Listen process is a process for responding to the Probe Request signal wirelessly sent from the specific device apparatus which is executing the Search process. That is, upon wirelessly receiving the Probe Request signal from the specific device apparatus, the communication controlling unit 40 wirelessly sends a Probe Response signal. This Probe Response signal includes information indicating that the printer 10 is in the device state, information indicating the device name and the category of the printer 10, and the MAC address of the printer 10. The specific device apparatus can find the printer 10 by means of the communication controlling unit 40 sending the Probe Response signal.

In the Search process, the communication controlling unit 40 sequentially uses the three channels 1 ch, 6 ch, 11 ch to sequentially send a Probe Request signal wirelessly. Thereby, the communication controlling unit 40 wirelessly receives a Probe Response signal from the specific device apparatus. This Probe Response signal includes information indicating that the specific device apparatus is in the device state, information indicating the device name and the category of the specific device apparatus, and a MAC address of the specific device apparatus. Thereby, the communication controlling unit 40 can find the specific device apparatus. Moreover, the specific G/O apparatus, also, can wirelessly send a Probe Response signal to the printer 10 in response to the Probe Request signal sent in the Search process of the printer 10. However, this Probe Response signal includes information indicating that the apparatus is in the G/O state, and does not include information indicating that the apparatus is in the device state. Further, as described above, even if an apparatus that is in the client state wirelessly receives a Probe Request signal from the printer 10, the apparatus that is in the client state does not wirelessly send a Probe Response signal to the printer 10. Consequently, in the Search process, the communication controlling unit 40 can appropriately find the specific device apparatus.

Moreover, in S54, after first having executed the Scan process one time, the communication controlling unit 40 repeatedly executes the set of the Listen process and the Search process until a predetermined period has elapsed. Although not shown in the flowchart of FIG. 3, when the predetermined period elapses, the controller 30 causes a screen in the display unit 14 to be displayed for the user to select whether to continue or end the Listen process and the Search process. If the user selects "continue", the communication controlling unit 40 repeatedly executes the set of the Listen process and the Search process until the predetermined period has again elapsed. If the user selects "end", the process proceeds to S56.

In S56, the communication controlling unit 40 determines whether a connection request signal has been wirelessly received from the object apparatus during the process S54. In case a connection request signal has been wirelessly received during the process S54 (the case of YES in S56), the communication controlling unit 40 skips S58 and S60, and proceeds to S62. On the other hand, in case a connection request signal not been received (the case of NO in S56), the process proceeds to S58.

In S58, the controller 30 causes the display unit 14 to display an apparatus list. The controller 30 can find the specific G/O apparatus in the Scan process (see S54), and can find the specific device apparatus in the Search process (see S54). The controller 30 causes the display unit 14 to display information relating to the apparatuses found in the process S54 (i.e., the information acquired in S54). In the example of FIG. 3, in S58, information (G/O state, printer, MAC address) relating to an apparatus corresponding to a device name "XXX", and information (device state, PC, MAC address) relating to an apparatus corresponding to a device name "YYY" is displayed in the display unit 14.

The user can learn the apparatuses present in the surroundings of the printer 10 by looking at the apparatus list displayed in S58, and can execute the apparatus selection operation in the operating unit 12 to select which apparatus should establish a wireless connection with the printer 10 (i.e., an operation to select the object apparatus (e.g., the PC 60)). When the apparatus selection operation has been performed, the controller 30 determines YES in S60, and proceeds to an authentication connection process of S62.

Figure 4:
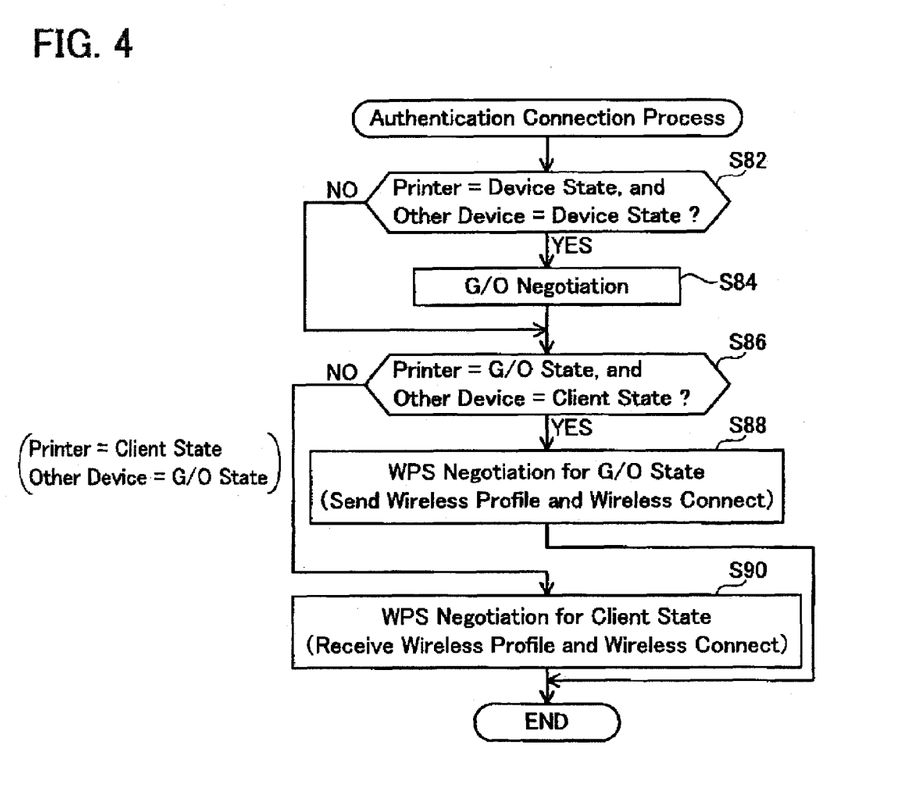
FIG. 4 shows a flowchart of an authentication connection process.

(Authentication Connection Process; FIG. 4)

In S62, the controller 30 executes the authentication connection process. The process described below is executed first, before the process S82 of FIG. 4 is executed. If the connection mode of the printer 10 and the object apparatus is the PIN code mode, the PIN code is displayed in one of the printer 10 and the object apparatus, and the user inputs the PIN code into the other apparatus from among the printer 10 and the object apparatus. If the display or input of the PIN code is executed in the printer 10, the process proceeds to S82. On the other hand, if the connection mode of the printer 10 and the object apparatus is the PBC mode, the process proceeds to S82 without the display or input of the PIN code being executed.

In S82, the establishment controlling unit 42 determines whether the current state of the printer 10 is the device state and whether the current state of the object apparatus is the device state. In case of YES in S82 (the current state of the printer 10=device state, and the current state of the object apparatus=device state), the process proceeds to S84.

Moreover, as described above, the object apparatus is determined as follows according to each case. (Case 1) In case of YES in S52 of FIG. 3, in case a connection request signal has been received (the case of YES in S18) before the mode selection operation is performed by the user, YES is determined in S52 of FIG. 3. In this case, an apparatus that is the sending source of the connection request signal that was last received (i.e., an apparatus having the information stored in S20 of FIG. 2) is the object apparatus. (Case 2) In case a connection request signal has been received after the mode selection operation has been performed by the user, YES is determined in S56 of FIG. 3. In this case, an apparatus that is the sending source of the connection request signal received in S56 of FIG. 3 is the object apparatus. (Case 3) In case a connection request signal is not received, the apparatus list is displayed in S58 of FIG. 3. An apparatus selected from the apparatus list by the user is the object apparatus.

In S84, the establishment controlling unit 42 executes a G/O negotiation with the object apparatus. As described above, only one G/O state apparatus can be present in one wireless network. Consequently, the establishment controlling unit 42 executes the G/O negotiation, determining one apparatus from among the printer 10 and the object apparatus as the G/O, and determining the other apparatus as the client.

In S84, first, the establishment controlling unit 42 wirelessly sends a connection request signal to the object apparatus, and wirelessly receives an OK signal from the object apparatus. Next, the establishment controlling unit 42 wirelessly sends information indicating G/O priority of the printer 10 to the object apparatus, and wirelessly receives information indicating G/O priority of the object apparatus from the object apparatus. Moreover, the G/O priority of the printer 10 is an index indicating the priority with which the printer 10 should become the G/O, and is predetermined in the printer 10. Similarly, the G/O priority of the object apparatus is an index indicating the priority with which the object apparatus should become the (I/O. For example, an apparatus (e.g., a PC) in which CPU and memory capacity are comparatively high can execute other processes rapidly while operating as a G/O. Consequently, in this type of apparatus, the G/O priority is usually set such that the priority of becoming G/O is high. On the other hand, e.g., an apparatus in which CPU and memory capacity are comparatively low might not be able to execute other processes rapidly while operating as a G/O. Consequently, in this type of apparatus, the G/O priority is usually set such that the priority of becoming G/O is low.

The establishment controlling unit 42 compares the G/O priority of the printer 10 and the G/O priority of the object apparatus, determines the apparatus (the printer 10 or the object apparatus) with the higher priority as the G/O, and determines the apparatus (the object apparatus or the printer 10) with the lower priority as the client. The object apparatus determines the G/O and the client based on the G/O priority of the printer 10 and the G/O priority of the object apparatus using the same method as the printer 10. When the G/O negotiation of 884 ends, the process proceeds to S86.

Moreover, upon ending the G/O negotiation of S84, the printer 10 transfers from the device state to the determined state (i.e., the G/O state or the client state). Further, the object apparatus also transfers from the device state to the determined state (i.e., the client state or the G/O state).

Further, in case it was determined in S82 that the current state of the object apparatus is the G/O state (the case of NO in S82), the printer 10 transfers from the device state or the G/O state to the client state without executing the G/O negotiation of S84. This is because, since only one apparatus in the G/O state can be present in one wireless network, the printer 10 cannot assume the G/O state. Further, in case it was determined in S82 that the current state of the printer 10 is the G/O state (the case of NO in S82), the printer 10 is maintained in the G/O state, which is the current state, without executing the G/O negotiation of S84. In this case, the object apparatus transfers from the device state to the client state. In case of NO in S82, the process proceeds to S86.

In S86, the establishment controlling unit 42 determines whether the current state of the printer 10 is the G/O state, and whether the current state of the object apparatus is the client state. In the case of YES in S86 (the current state of the printer 10=G/O state, and the current state of the object apparatus=client state), the establishment controlling unit 42 proceeds to S88. On the other hand, in the case of NO in S86 (the current state of the printer 10=client state, and the current state of the object apparatus=G/O state), the process proceeds to S90.

In S88, the establishment controlling unit 42 executes WPS negotiation for the G/O state. For example, in case the connection mode selected in S22 of FIG. 2 is the PIN code mode, the establishment controlling unit 42 converts specific data (e.g., packet data communicated last between the printer 10 and the object apparatus) into a hash code using the PIN code displayed in the printer 10 or the PIN code input into the printer 10. In this case, the object apparatus, also, converts the specific data into a hash code using the PIN code displayed in the object apparatus or the PIN code input into the object apparatus. Further, e.g., in case the connection mode selected in S22 of FIG. 2 is the PBC mode, the establishment controlling unit 42 converts the specific data into a hash code using a predetermined PIN code. In this case, the object apparatus, also, converts the specific data into a hash code using the predetermined PIN code.

Either the printer 10 or the object apparatus determines whether the hash code created by the printer 10 and the hash code created by the object apparatus are matching (i.e., executes authentication of the PIN code). In case the two hash codes match, i.e., in case authentication of the PIN code succeeds, the establishment controlling unit 42 wirelessly sends a wireless profile (SSID, authentication mode, encryption mode, password, etc.), which is needed to establish a wireless connection, to the object apparatus. According to this configuration, in case the printer 10 is operating in the G/O state, the printer 10 can wirelessly communicate the wireless profile with the object apparatus appropriately. Moreover, the authentication mode and the encryption mode are predetermined. Further, the SSID and the password may be created by the establishment controlling unit 42 in the process S88, or may be predetermined.

The object apparatus wirelessly receives the wireless profile from the printer 10. Thereby, the printer 10 and the object apparatus can use the same wireless profile. That is, by using the wireless profile, the printer 10 and the object apparatus wirelessly communicate an Authentication Request, Authentication Response, Association Request, Association Response, and 4way handshake (in the printer 10, the establishment controlling unit 42 executes this wireless communication). During this process, the printer 10 and the object apparatus execute various authentication processes such as SSID authentication, authentication mode and encryption mode authentication, password authentication, etc. In case all the authentications succeeded, a wireless connection is established between the printer 10 and the object apparatus. Moreover, in case the authentication of the PIN code failed, the authentication connection process ends without a wireless connection being established between the printer 10 and the object apparatus.

Moreover, if the wireless connection is established in S88, the controller 30 further adds the MAC address of the object apparatus to the administration list. Thereby, it becomes possible to communicate object data (printing data, etc.) of a communication object between the printer 10 that is in the G/O state and the object apparatus that is in the client state. Moreover, the object data includes network layer data, which is a layer higher than the physical layer of the OSI reference model. That is, the printer 10 that is in the G/O state can execute wireless communication of the network layer with the object apparatus that is in the client state. Further, it becomes possible for the printer 10 that is in the G/O state to relay wireless communication between the object apparatus which is in the client state and another apparatus which is registered in the administration list.

On the other hand, in S90, the establishment controlling unit 42 executes WPS negotiation for the client state. Specifically, after the authentication of the PIN code has succeeded, this authentication being executed in the same manner as S88, the establishment controlling unit 42 wirelessly receives a wireless profile (SSID, authentication mode, encryption mode, password, etc.), which is needed to establish a wireless connection, from the object apparatus. According to this configuration, in case the printer 10 is operating in the client state, the printer 10 can communicate the wireless profile with the object apparatus appropriately. The subsequent processes (the communication process of the Authentication Request, etc.) are the same as S88. Consequently, the printer 10 that is in the client state becomes able to wirelessly communicate object data (printing data, etc.) with the object apparatus that is in the G/O state. Further, it becomes possible for the printer 10 that is in the client state to wirelessly communicate, via the object apparatus that is in the G/O state, object data with another apparatus (i.e., another apparatus registered in the administration list of the object apparatus). When S88 or S90 ends, the authentication connection process of FIG. 4 ends.

Figure 5:
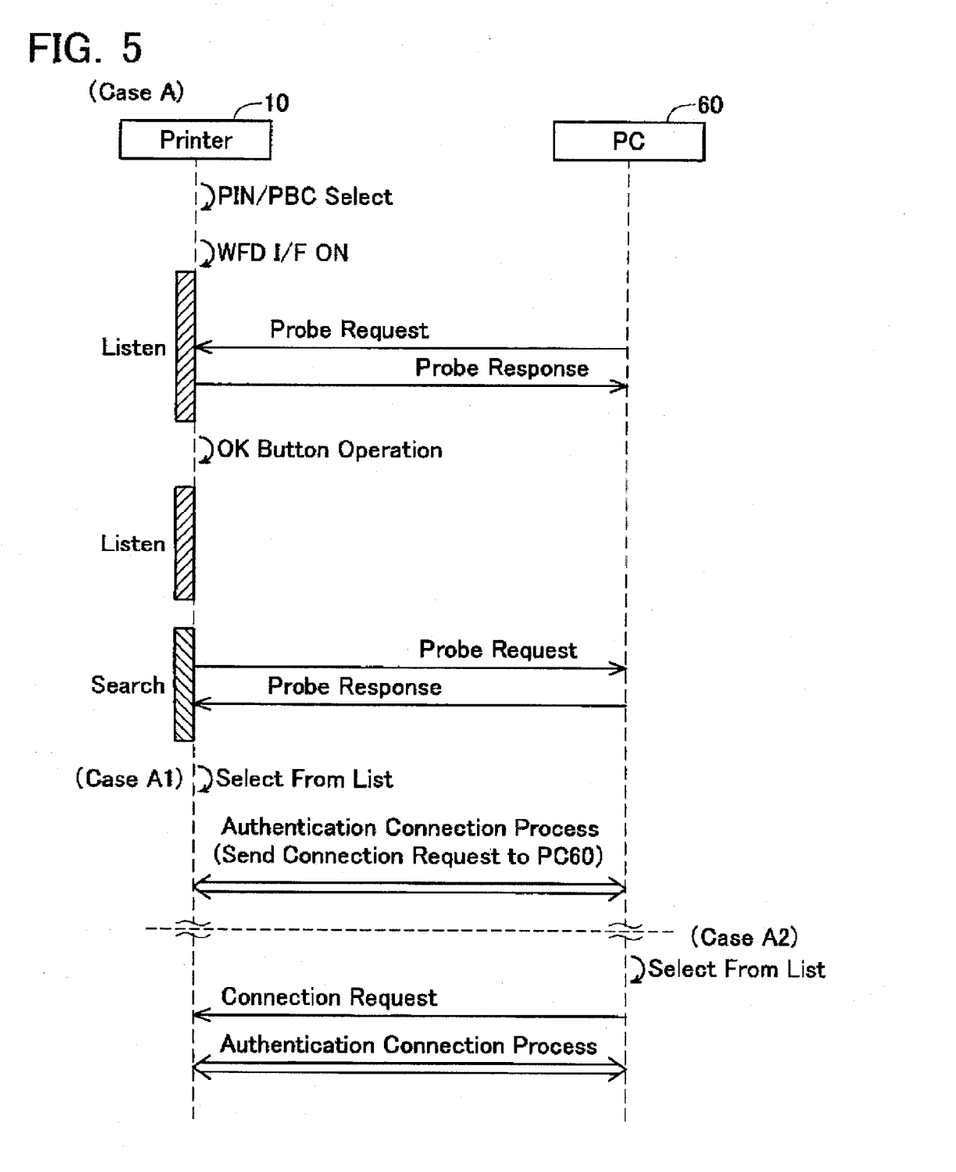
FIG. 5 shows a sequence view of a case A.

(Case A; FIG. 5)

An example of processes executed by the printer 10 and the PC 60 (Case A) will be described with reference to FIG. 5. At the time of starting the processes of FIG. 5, the setting of the printer 10 is the WFD I/F OFF setting. The user performs the mode selection operation in the operating unit 12 of the printer 10 to select the PIN code mode or the PBC mode. In this case, the printer 10 determines YES in S22 of FIG. 2, determines NO in S40 of FIG. 3, and in S42 of FIG. 3 displays a screen prompting change to the WFD I/F ON setting.

While looking at the screen displayed in S42 of FIG. 3, the user performs an operation in the operating unit 12 of the printer 10 to change to the WFD I/F ON setting. In this case, the printer 10 determines YES in S44 of FIG. 3, and starts the Listen process (S46 of FIG. 3). In this case, the Search process is not executed. That is, in the present embodiment, only the Listen process is executed, with the operation to change to the WFD I/F ON setting (YES in S44) being performed being the trigger, and the Search process is not executed. If a configuration were adopted in which both the Listen process and the Search process were performed with YES in S44 as the trigger, the tune for executing the Listen process would be shorter, and consequently it would become difficult for the PC 60 to find the printer 10. Since the printer 10 of the present embodiment does not execute the Search process with YES in S44 as the trigger, the time for executing the Listen process can be kept longer, and consequently the PC 60 can find the printer 10 appropriately. However, in a variant, the Listen process and the Search process may be executed repeatedly as a set with the operation to change to the WFD I/F ON setting being performed (YES in S44) being the trigger.

The user performs the mode selection operation in the operating unit of the PC 60 to select the PIN code mode or the PBC mode. In this case, the PC 60 executes the Scan process, the Listen process, and the Search process. In the course of the Search process, the PC 60 wirelessly sends a Probe Request signal to the printer 10. As described above, since the printer 10 has started the Listen process, the printer 10 wirelessly sends a Probe Response signal to the PC 60. Consequently, the PC 60 can find the printer 10, and the apparatus list including information related to the printer 10 can be displayed in the display unit of the PC 60.

On the other hand, in S48 of FIG. 3 the printer 10 displays a screen prompting the setting of the object apparatus to be changed to the WFD IN ON setting. While looking at the screen displayed in S48 of FIG. 3, the user performs the operation to select the OK button in the operating unit 12 of the printer 10. In this case, the printer 10 determines YES in S50 of FIG. 3. Since the printer 10 has not received a connection request signal from the PC 60, NO is determined in S52 of FIG. 3, and the Scan process, the Listen process, and the Search process are executed (S54 of FIG. 3). During the Search process, the printer 10 wirelessly sends a Probe Request signal to the PC 60, and wirelessly receives a Probe Response signal from the PC 60. Consequently, the printer 10 can find the PC 60, and can cause the apparatus list including information related to the PC 60 to be displayed in the display unit 14 (S58 of FIG. 3).

(Case A1)

For example, the user can select the PC 60 from the apparatus list displayed in the display unit 14 of the printer 10 before selecting the printer 10 from the apparatus list displayed in the PC 60. In this case, the printer 10 determines YES in S60 of FIG. 3, and executes the authentication connection process of S62 of FIG. 3. In the authentication connection process (S84 of FIG. 4), the printer 10 wirelessly sends a connection request signal to the PC 60. As is clear from this description, the connection request signal that is sent from the printer 10 in case A1 is a signal sent in the case where the printer 10 finds the PC 60 (i.e., the case where the printer 10 receives a Probe Response signal from the PC 60). Upon wirelessly receiving the connection request signal from the printer 10, the PC 60 wirelessly sends an OK signal to the printer 10. Moreover, in this case, the PC 60 wirelessly sends the OK signal to the printer 10 in response to the connection request signal received from the printer 10 without the user needing to select the printer 10 from the apparatus list displayed in the PC 60. Then, the processes from S82 of FIG. 4 onwards are executed, and a wireless connection between the printer 10 and the PC 60 is established.

(Case A2)

For example, the user can select the printer 10 from the apparatus list displayed in the PC 60 before selecting the PC 60 from the apparatus list displayed in the display unit 14 of the printer 10. In this case, the PC 60 wirelessly sends a connection request signal to the printer 10. As is clear from this description, the connection request signal that is sent from the PC 60 in case A2 is a signal sent in the case where the PC 60 finds the printer 10 (i.e., the case where the PC 60 receives a Probe Response signal from the printer 10). Upon receiving the connection request signal from the PC 60, the printer 10 determines YES in S56 of FIG. 3, and executes the authentication connection process of S62 of FIG. 3. Consequently, the user does not need to select the PC 60 from the apparatus list displayed in the printer 10. The processes from S82 of FIG. 4 onwards are executed, and a wireless connection between the printer 10 and the PC 60 is established.

Figure 6:
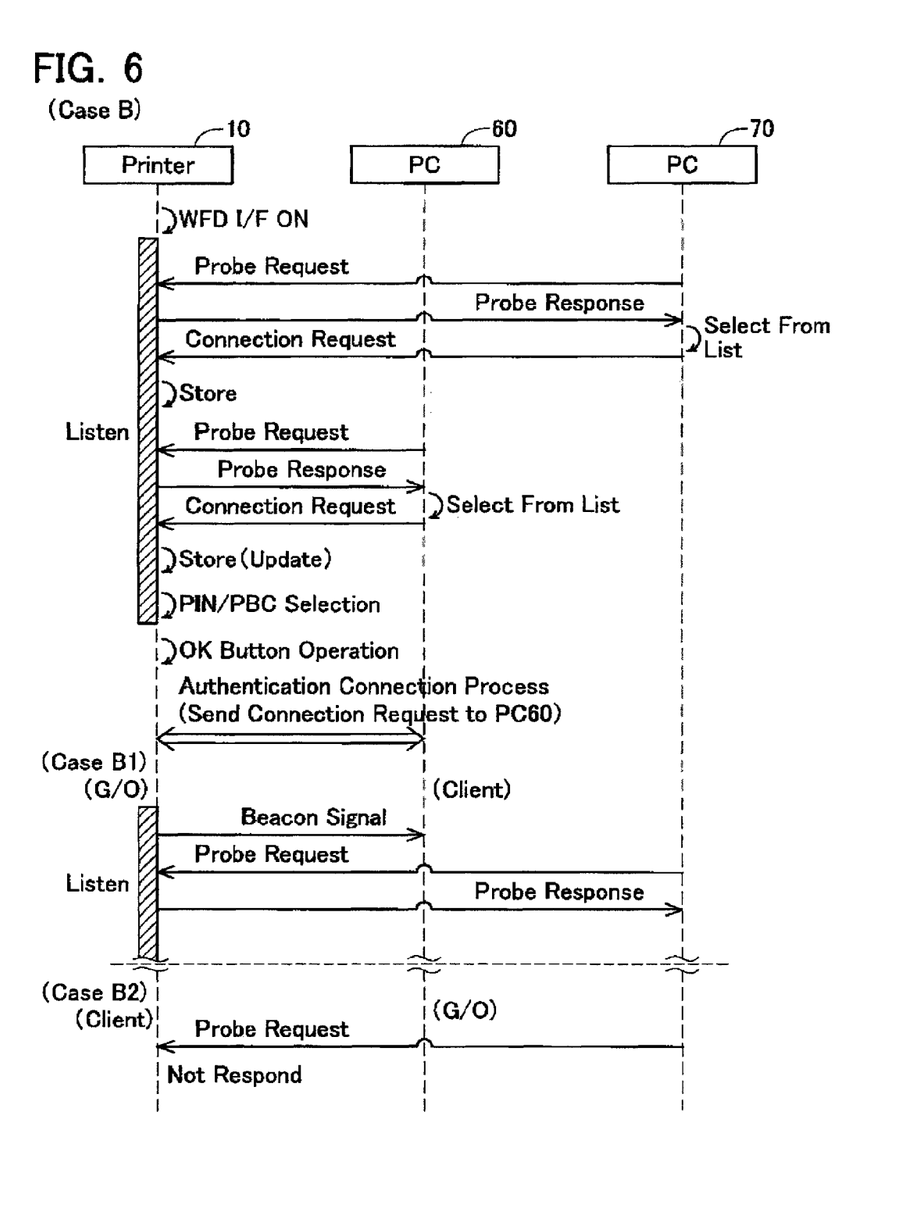
FIG. 6 shows a sequence view of a case B.

(Case B; FIG. 6)

In case B of FIG. 6, the user performs the operation to change to the WFD I/F ON setting before performing the mode selection operation in the operating unit 12 of the printer 10 to select the PIN code mode or the PBC mode. In this case, the printer 10 determines YES in S10 of FIG. 2, and starts the Listen process (S12 of FIG. 2). In this case, the Search process is not executed.

The user might mistakenly perform the mode selection operation in an operating unit of the PC 70 despite wanting to cause the PC 60 to be wirelessly connected with the printer 10. In this case, the PC 70 executes the Search process, and wirelessly sends a Probe Request signal to the printer 10. As described above, since the Listen process has started in the printer 10, the printer 10 wirelessly sends a Probe Response signal to the PC 70. Consequently, the PC 70 can find the printer 10, and an apparatus list including information related to the printer 10 can be displayed in a display unit of the PC 70.

The user can select the printer 10 from the apparatus list displayed in the PC 70. In this case, the printer 10 determines YES in S18 of FIG. 2, and causes information related to the PC 70 to be stored in the predetermined storage area within the memory 34.

Next, upon realizing the mistake, the user performs the mode selection operation in the operating unit of the PC 60. In this case, the PC 60 executes the Search process, and wirelessly sends a Probe Request signal to the printer 10. As described above, since the Listen process has started in the printer 10, the printer 10 wirelessly sends a Probe Response signal to the PC 60. Consequently, the PC 60 can find the printer 10, and the apparatus list including information related to the printer 10 can be displayed in the display unit of the PC 60.

The user can select the printer 10 from the apparatus list displayed in the PC 60. In this case, the PC 60 wirelessly sends a connection request signal to the printer 10. Consequently, the printer 10 determines YES in S18 of FIG. 2, deletes the information related to the PC 70 from the predetermined storage area, and causes information related to the PC 60 to be stored in the predetermined storage area. That is, the printer 10 updates the stored contents of the predetermined storage area.

Next, the user performs the mode selection operation in the operating unit 12 of the printer 10 to select the PIN code mode or the PBC mode. In this case, the printer 10 determines YES in S22 of FIG. 2, and then determines YES in S40 of FIG. 3. Thereupon, while looking at the screen displayed in S48 of FIG. 3, the user selects the OK button. In this case, the printer 10 determines YES in S50 of FIG. 3, then determines YES in S52 of FIG. 3, skips S54 to S60, and proceeds to the authentication connection process of S62. That is, since the printer 10 does not execute the Listen process and the Search process, the authentication connection process can be started quickly. Further, since the apparatus list in the printer 10 is not displayed, the user does not need to select the PC 60 from the apparatus list. In the authentication connection process (S84 of FIG. 4), the printer 10 wirelessly sends a connection request signal to the PC 60. Then the processes from S82 of FIG. 4 onwards are executed, and a wireless connection between the printer 10 and the PC 60 is established.

As described above, only information related to the sending source of the most recently received connection request signal is stored in the predetermined storage area within the memory 34. Consequently the user can appropriately establish a wireless connection between the PC 60 and the printer 10.

(Case B1)

Case $B_1$ is a case in which a wireless connection is established between the printer 10 and the PC 60, the printer 10 is in the G/O state, and the PC 60 is in the client state.

While the printer 10 is in the G/O state, the communication controlling unit 40 wirelessly sends a beacon signal in which the destination is unspecified. The beacon signal includes information related to the printer 10 (e.g., MAC address, IP address of the printer 10, etc.). Consequently, by receiving the beacon signal, the PC 60 that is in the client state can confirm that communication is possible with the printer 10 that is in the G/O state (e.g., the power supply of the printer 10 is not OFF, etc.).

Further, while the printer 10 is the G/O state, the communication controlling unit 40 continues to execute the Listen process. Consequently, if a Probe Request signal were received from the PC 70, the communication controlling unit 40 can wirelessly send a Probe Response signal to the PC 70.

(Case B2)

Case B2 is a case in which a wireless connection is established between the printer 10 and the PC 60, the printer 10 is in the client state, and the PC 60 is in the G/O state.

While the printer 10 is in the client state, the communication controlling unit 40 does not wirelessly send the beacon signal. Further, while the printer 10 is in the client state, the communication controlling unit 40 does not execute the Listen process. Consequently, even if a Probe Request signal were received from the PC 70, the communication controlling unit 40 would not wirelessly send a Probe Response signal to the PC 70.

Moreover, although not shown, while the printer 10 is in the client state or the device state, the user can perform an operation in the operating unit 12 of the printer 10 to change the printer 10 to the G/O state. In this case, as in case B of FIG. 6 (as in the case of change to the WFD I/F ON setting), the communication controlling unit 40 continues to execute the Listen process. Consequently, the PC 60, etc. can appropriately find the printer 10.

(Result of Present Embodiment)

As shown in FIG. 5, when the OK button displayed in the screen in S48 of FIG. 3 is selected, the printer 10 executes the Listen process and the Search process. Consequently, the printer 10 may find the PC 60, and the PC 60 may find the printer 10. Moreover, as shown in FIG. 5 and FIG. 6, the printer 10 executes the Listen process, with the change to the WFD I/F ON setting being the trigger, before the selection of the OK button is performed. Consequently, in the case where the PC 60 executes the Search process before the selection of the OK button is performed in the printer 10, the printer 10 can receive a Probe Request signal from the PC 60 and send a Probe Response signal to the PC 60. That is, since the Listen process is performed before the selection of the OK button is performed, the chance of the PC 60 finding the printer 10 can be improved. Consequently, a wireless connection between the PC 60 and the printer 10 can be established appropriately.

(Corresponding Relationships)

The printer 10 and the PC 60 are respectively examples of the "wireless communication device" and the "specific external device". The Listen process and the Search process are respectively examples of the "response process" and the "search process". The operation to select the OK button included in the screen displayed in S48 of FIG. 3, and the operation to change to the WFD I/F ON setting are respectively examples of the "first operation" and the "second operation". The period in which the Listen process and the Search process are performed after the OK button has been operated, and the period in which the Listen process is performed after the operation to change to the WFD ON setting has been performed, are respectively examples of the "first period" and the "second period". The Probe Request signal and the Probe Response signal are respectively examples of the "search signal" and the "response signal". Further, the G/O state and the client state are respectively examples of the "parent state" and the "child state". Further, the WFD I/F OFF setting and the WFD I/F ON setting are respectively examples of the "first setting" and the "second setting".

Variants of the foregoing embodiment are listed below.

(1) The "wireless communication device" is not restricted to the printer 10, but may be another apparatus capable of wireless communication (e.g., a mobile phone, PDA, PC, server, FAX device, copier, scanner, multi-function device, etc.). Further, the "specific external device" is not restricted to the PC 60, but may be another apparatus capable of wireless communication (e.g., a mobile phone, PDA, server, printer, FAX device, copier, scanner, multi-function device, etc.).

(2) The "parent state" is not restricted to the WFD G/O state, but may be any state that manages other devices constituting the wireless network (e.g., manages a list of information relating to another device, relays wireless communication of another device, etc.). Further, the "child state" is not restricted to the WFD client state, but may be any state managed by a parent state apparatus.

(3) In the foregoing embodiment, the operation to select the OK button included in the screen displayed in S48 of FIG. 3 is an example of the "first operation". However, the "first operation" may be any kind of operation, as long as it is an operation to trigger the execution of the search process and response process.

(4) In the foregoing embodiment, the CPU 32 of the printer 10 realizes the units 40, 42 by executing processes according to software. Instead, at least one of the units 40, 42 may be realized by a hardware resource such as a logic circuit.

What is claimed is:

1. A wireless communication device comprising:
one or more processors; and
a memory that stores a computer program including instructions to be executed by the one or more processors,
wherein the instructions cause the one or more processors, when executed by the one or more processors, to function as:
a communication controlling unit configured to repeatedly execute, when a first operation is performed, a set including a response process and a search process in a first period,
the response process including receiving a search signal from a specific external device and sending a response signal to the specific external device in response to the search signal, the search signal received from the specific external device being a signal for the specific external device to search for the wireless communication device, and
the search process including sending the search signal to the specific external device and receiving the response signal from the specific external device, the search signal sent to the specific external device being a signal for the wireless communication device to search for the specific external device; and
an establishing controlling unit configured to communicate a wireless profile with the specific external device so as to establish a wireless connection with the specific external device by using the wireless profile in a case where the first operation is performed,
wherein the communication controlling unit is further configured to execute before the first operation is performed, the response process without executing the search process in a second period, wherein the time for executing the response process in the second period is longer than in the first period.

2. The wireless communication device as in claim 1, wherein
the communication controlling unit is configured to:
not execute the response process and the search process in a case where the first operation is performed after a connection request signal is received from the specific external device; and
execute the response process and the search process in the first period, with the first operation being performed before the connection request signal is received from the specific external device as a trigger, and
the connection request signal is a signal that the specific external device sends to the wireless communication device in a case where the specific external device receives the response signal from the wireless communication device.

3. The wireless communication device as in claim 2, wherein in a case where the first operation is performed after a plurality of connection request signals is received from a plurality of external devices including the specific external device, the establishing controlling unit is configured to communicate the wireless profile with the specific external device that is a sending source of the connection request signal received at last from among the plurality of the connection request signals.

4. The wireless communication device as in claim 1, wherein
the wireless communication device is configured to be capable of operating selectively in any state among a plurality of states including a parent state performing as a parent station of a wireless network and a child state performing as a child station of the wireless network,
the establishing controlling unit is configured to:

communicate the wireless profile with the specific external device by sending the wireless profile to the specific external device in a case where the wireless communication device operates in the parent state; and communicate the wireless profile with the specific external device by receiving the wireless profile from the specific external device in a case where the wireless communication device operates in the child state.

5. The wireless communication device as in claim 4, wherein the communication controlling unit is configured to start the second period with a second operation for changing a first setting to a second setting as a trigger, the first setting is a setting in which the wireless communication device is incapable of operating selectively in any state among the plurality of states, and the second setting is a setting in which the wireless communication device is capable of operating selectively in any state among the plurality of states.

6. The wireless communication device as in claim 5, further comprising:

a wired communication interface; and a wireless communication interface, wherein the communication controlling unit is configured to:

be capable of executing a wired communication by using the wired communication interface and be incapable of executing a wireless communication by using the wireless communication interface while a setting of the wireless communication device is the first setting; and be capable of executing the wireless communication by using the wireless communication interface and be incapable of executing a wired communication by using the wired communication interface while the setting of the wireless communication device is the second setting.

7. The wireless communication device as in claim 4, wherein the communication controlling unit is further configured to wirelessly send a beacon signal including information related to the wireless communication device while the wireless communication device is operating in the parent state.

8. The wireless communication device as in claim 4, wherein the communication controlling unit is configured to:

be capable of executing the response process while the wireless communication device operates in the parent state; and be incapable of executing the response process while the wireless communication device operates in the child state.

9. A non-transitory computer-readable storage medium that stores a computer program for a wireless communication device, the computer program including instructions for causing one or more processors of the wireless communication device to perform:

repeatedly executing, when a first operation is performed, a set including a response process and a search process in a first period, the response process including receiving a search signal from a specific external device and sending a response signal to the specific external device in response to the search signal, the search signal received from the specific external device being a signal for the specific external device to search for the wireless communication device, and the search process including sending the search signal to the specific external device and receiving the response signal from the specific external device, the search signal sent to the specific external device being a signal for the wireless communication device to search for the specific external device;

communicating a wireless profile with the specific external device so as to establish a wireless connection with the specific external device by using the wireless profile in a case where the first operation is performed; and executing, before the first operation is performed, the response process without executing the search process in a second period, wherein the time for executing the response process in the second period is longer than in the first period.

10. A wireless communication device configured to be capable of operating selectively in any state among a plurality of states including a parent state performing as a parent station of a wireless network and a child state performing as a child station of the wireless network, the wireless communication device comprising:

one or more processors; and a memory that stores a computer program including instructions to be executed by the one or more processors, wherein the instructions cause the one or more processors, when executed by the one or more processors, to function as:

a communication controlling unit configured to repeatedly execute, when a first operation is performed, a set including a response process and a search process in a first period after the first operation, the response process including receiving a search signal from a specific external device and sending a response signal to the specific external device in response to the search signal, the search signal received from the specific external device being a signal for the specific external device to search for the wireless communication device, and the search process including sending the search signal to the specific external device and receiving the response signal from the specific external device, the search signal sent to the specific external device being a signal for the wireless communication device to search for the specific external device; and an establishing controlling unit configured to communicate a wireless profile with the specific external device so as to establish a wireless connection with the specific external device by using the wireless profile in a case where the first operation is performed, wherein the communication controlling unit is further configured to:

execute the response process in a second period before the first operation is performed; and start the second period with a second operation for changing a first setting to a second setting as a trigger, wherein the first setting is a setting in which the wireless communication device is incapable of operating selectively in any state among the plurality of states, and wherein the second setting is a setting in which the wireless communication device is capable of operating selectively in any state among the plurality of states, and wherein the establishing controlling unit is configured to:

communicate the wireless profile with the specific external device by sending the wireless profile to the specific external device in a case where the wireless communication device operates in the parent state; and communicate the wireless profile with the specific external device by receiving the wireless profile from the specific external device in a case where the wireless communication device operates in the child state.

11. The wireless communication device as in claim 10, further comprising:

a wired communication interface; and a wireless communication interface, wherein the communication controlling unit is configured to:

be capable of executing a wired communication by using the wired communication interface and be incapable of executing a wireless communication by using the wireless communication interface while a setting of the wireless communication device is the first setting; and be capable of executing the wireless communication by using the wireless communication interface and be incapable of executing a wired communication by using the wired communication interface while the setting of the wireless communication device is the second setting.

12. The wireless communication device as in claim 10, wherein the communication controlling unit is further configured to wirelessly send a beacon signal including information related to the wireless communication device while the wireless communication device is operating in the parent state.

13. The wireless communication device as in claim 10, wherein the communication controlling unit is configured to:

be capable of executing the response process while the wireless communication device operates in the parent state; and be incapable of executing the response process while the wireless communication device operates in the child state.

\* \* \* \* \*